United States Patent
Mhatre et al.

(10) Patent No.: US 9,923,827 B2
(45) Date of Patent: Mar. 20, 2018

(54) LOAD BALANCING AND MIGRATION OF TRANSPORT CONNECTIONS

(71) Applicant: AT&T Intellectual Property I, LP, Atlanta, GA (US)

(72) Inventors: Vivek Mhatre, Seattle, WA (US); Ryan Redfern, Cerritos, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 223 days.

(21) Appl. No.: 14/478,282

(22) Filed: Sep. 5, 2014

(65) Prior Publication Data

US 2016/0072713 A1    Mar. 10, 2016

(51) Int. Cl.
G06F 15/16    (2006.01)
H04L 12/803   (2013.01)
H04L 29/08    (2006.01)
H04L 29/06    (2006.01)

(52) U.S. Cl.
CPC ............ *H04L 47/125* (2013.01); *H04L 67/10* (2013.01); *H04L 67/1004* (2013.01); *H04L 67/1029* (2013.01); *H04L 67/42* (2013.01)

(58) Field of Classification Search
CPC ... H04L 47/125; H04L 67/10; H04L 67/1004; H04L 67/1029; H04L 67/42
USPC ........................................................ 709/235
See application file for complete search history.

(56) References Cited

U.S. PATENT DOCUMENTS

| 7,089,328 | B1 * | 8/2006 | O'Rourke | ......... H04L 29/12009 709/201 |
| 7,644,171 | B2 | 1/2010 | Sturniolo et al. | |
| 7,685,254 | B2 | 3/2010 | Pandya | |

(Continued)

FOREIGN PATENT DOCUMENTS

WO    2013026050 A1    2/2013

OTHER PUBLICATIONS

Kalim, Umar et al., "Seamless Migration of Virtual Machines Across Networks." Computer Communications and Networks (ICCCN), 2013 22nd International Conference, IEEE, 2013.

(Continued)

*Primary Examiner* — Bryan Lee
*Assistant Examiner* — Oluwatosin Gidado
(74) *Attorney, Agent, or Firm* — Guntin & Gust, PLC; Joseph Hrutka

(57) ABSTRACT

Aspects of the subject disclosure may include, for example, a server comprising a memory to store instructions and a controller coupled to the memory, in which the controller, responsive to executing the instructions, performs operations. The operations include detecting a condition requiring a migration of an active transport connection at a source server to a target server without interrupting communications occurring in the active transport connection. The source server is directed to transmit to the target server a migration command with state information from the source server to enable migrating the active transport connection to the target server without interrupting communications occurring in the active transport connection. A message is then received from the source server indicating the source server has received from the target server an acknowledgment that the migrating has been performed. Other embodiments are disclosed.

19 Claims, 11 Drawing Sheets

(56) References Cited

U.S. PATENT DOCUMENTS

| | | | |
|---|---|---|---|
| 7,886,076 B2* | 2/2011 | Brabson | H04W 8/082 |
| | | | 709/227 |
| 7,962,647 B2 | 6/2011 | Suri et al. | |
| 7,984,123 B2 | 7/2011 | Tripathi et al. | |
| 8,234,377 B2 | 7/2012 | Cohn | |
| 8,432,791 B1* | 4/2013 | Masters | H04L 1/22 |
| | | | 370/221 |
| 8,458,331 B2 | 6/2013 | Chauhan et al. | |
| 8,532,108 B2 | 9/2013 | Li et al. | |
| 8,589,919 B2 | 11/2013 | Smith et al. | |
| 8,719,914 B2 | 5/2014 | Edwards et al. | |
| 2005/0261985 A1* | 11/2005 | Miller | G06F 17/30902 |
| | | | 709/223 |
| 2009/0300605 A1 | 12/2009 | Edwards et al. | |
| 2010/0174770 A1 | 7/2010 | Pandya | |
| 2010/0306381 A1* | 12/2010 | Lublin | G06F 15/16 |
| | | | 709/226 |
| 2012/0039339 A1* | 2/2012 | Kurita | H04L 45/00 |
| | | | 370/400 |
| 2012/0096134 A1 | 4/2012 | Suit | |
| 2012/0303799 A1 | 11/2012 | Hadas et al. | |
| 2012/0307825 A1 | 12/2012 | Hui et al. | |
| 2012/0311106 A1 | 12/2012 | Morgan | |
| 2013/0046874 A1 | 2/2013 | Cohn | |
| 2013/0111540 A1 | 5/2013 | Sabin | |
| 2013/0132531 A1 | 5/2013 | Koponen et al. | |
| 2013/0151661 A1 | 6/2013 | Koponen et al. | |
| 2013/0151676 A1 | 6/2013 | Thakkar et al. | |
| 2013/0238690 A1 | 9/2013 | Kashyap | |
| 2013/0268643 A1 | 10/2013 | Chang et al. | |
| 2013/0283364 A1 | 10/2013 | Chang et al. | |

OTHER PUBLICATIONS

Koponen, Teemu et al., "Network virtualization in multi-tenant datacenters." Networked Systems Design and Implementation, 2014.

Mogul, Jeffrey et al., "Unveiling the transport." ACM SIGCOMM Computer Communication Review 34.1 (2004): 99-106.

Osman, Steven et al., "The design and implementation of Zap: A system for migrating computing environments." ACM SIGOPS Operating Systems Review 36.SI (2002): 361-376.

Sultan, Florin et al., "Migratory TCP: Highly available Internet services using connection migration." Proceedings of ICDCS, 2002.

* cited by examiner

300

500

LOAD BALANCING AND MIGRATION OF TRANSPORT CONNECTIONS

FIELD OF THE DISCLOSURE

The subject disclosure relates to load balancing in server networks and migration of inter-server transport connections.

BACKGROUND

Cloud computing for web services and storage, together with virtualization of mobility infrastructure, is rapidly developing as an industry. Many applications of virtualization of mobility infrastructure are based on long-lived transport connections, for example long-lived stream control transport protocol (SCTP) connections.

BRIEF DESCRIPTION OF THE DRAWINGS

Reference will now be made to the accompanying drawings, which are not necessarily drawn to scale, and wherein.

DETAILED DESCRIPTION

Figure 1:
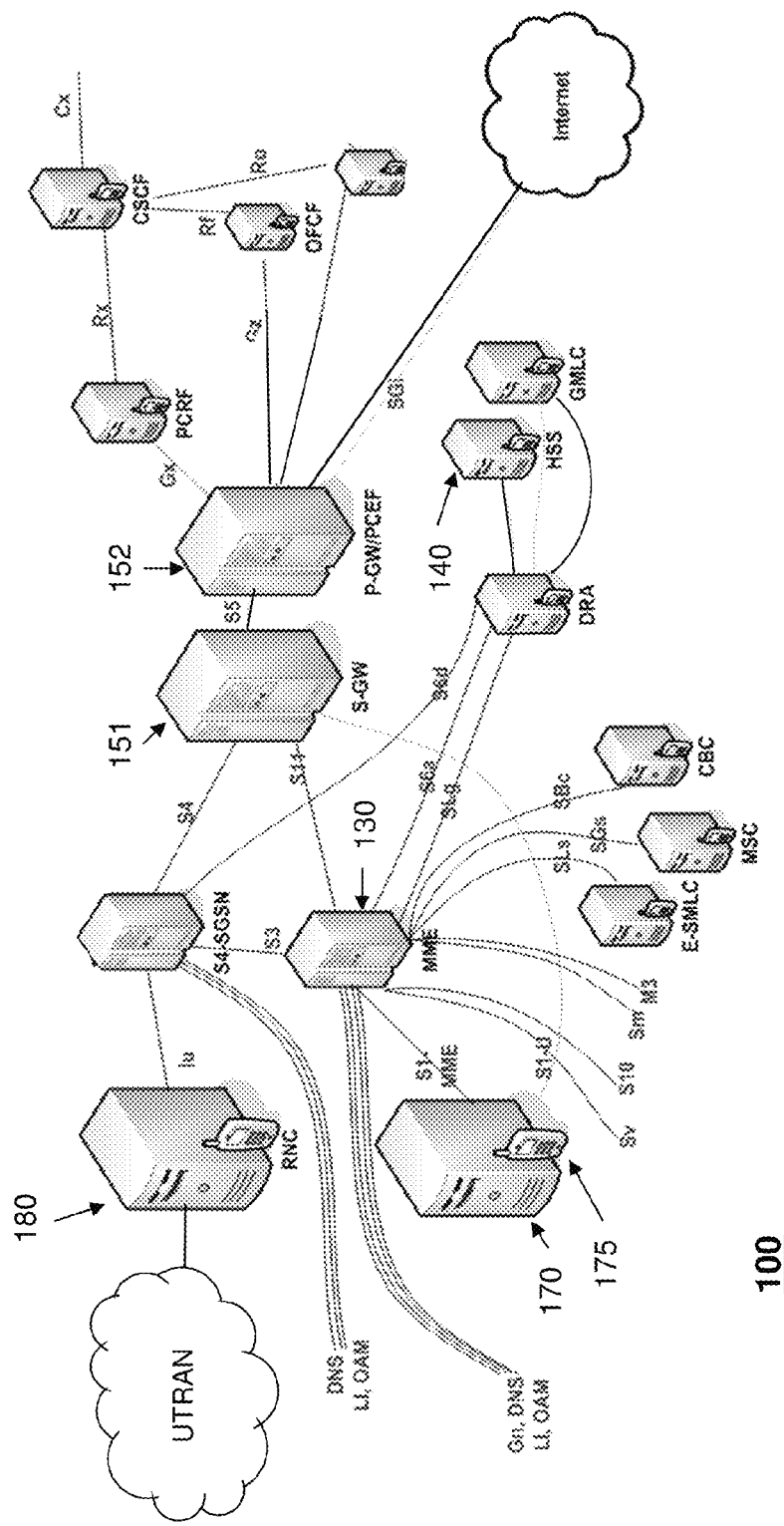
FIG. 1 schematically illustrates a signaling network with SCTP connections, in accordance with an embodiment of the disclosure.

The subject disclosure describes, among other things, illustrative embodiments for migrating transport connections between servers in a network, to provide load balancing across the servers and to permit offloading of servers for maintenance. Other embodiments are described in the subject disclosure.

One or more aspects of the subject disclosure include a system and method for migrating live transport connections between servers as servers are added to (or removed from) a network, to provide elastic capacity for server growth. The migration is fully transparent to the other endpoint of the transport connection; no signaling is performed towards the other endpoint, avoiding generation of additional traffic. A live connection has a current state associated with it (e.g. congestion window, packet sequence numbers, timers, etc.) and has a state information table on a load balancer. The live connection is migrated from one server to another while updating the load balancer table.

One embodiment of the subject disclosure includes a method comprising detecting, by a load balancing device comprising a processor, a condition requiring a migration of an active transport connection at a source server to a target server without interrupting communications occurring in the active transport connection. The method also comprises sending instructions to the source server, wherein the instructions comprise an identification of the target server, an identification of the active transport connection, and a migration request that directs the source server to transmit to the target server a migration command with state information from the source server to enable migrating the active transport connection to the target server without interrupting communications occurring in the active transport connection. The method further comprises receiving a message from the source server indicating the source server has received from the target server an acknowledgment that the migration request has been completed, and updating a table to direct future traffic to the active transport connection managed by the target server.

One embodiment of the subject disclosure includes a load balancing device comprising a memory to store instructions and a controller coupled to the memory. The controller, responsive to executing the instructions, performs operations. The operations comprise detecting a condition requiring a migration of an active transport connection at a source server to a target server without interrupting communications occurring in the active transport connection. The operations also comprise directing the source server to transmit to the target server a migration command with state information from the source server to enable migrating the active transport connection to the target server without interrupting communications occurring in the active transport connection. The operations also comprise receiving a message from the source server indicating the source server has received from the target server an acknowledgment that the migrating has been performed.

One embodiment of the subject disclosure includes computer-readable storage device comprising instructions which, when executed by a processor, cause the processor to perform operations. The operations comprise monitoring a current state of a network including a source server, a target server, and an active transport connection at the source server, and detecting a condition requiring a migration of the active transport connection to the target server without interrupting communications occurring in the active transport connection. The operations also comprise directing the source server to transmit to the target server a migration command with state information from the source server to enable migrating the active transport connection to the target server without interrupting communications occurring in the active transport connection. The operations also comprise receiving a message from the source server indicating the source server has received from the target server an acknowledgment that the migration has been completed, and updating a table to direct future traffic to the active transport connection managed by the target server.

FIG. 1 schematically illustrates a signaling network 100 with SCTP connections, in accordance with an embodiment of the disclosure. Network 100 includes a mobility network having a mobility management entity (MME) 130, a home subscriber server (HSS) 140, serving and packet gateways 151, 152, an eNB 170 and communication device 175, and a radio network controller 180 that connects to a universal terrestrial radio access network (UTRAN).

As is understood in the art, SCTP connections in mobility networks and internet protocol multimedia subsystem (IMS) core networks are set up when a signaling endpoint node is established, and remain live as long as the node exists. Accordingly, SCTP connections in those networks can be characterized as "long-lived" connections. In contrast to short-lived connections (e.g. transmission control protocol connections on typical web servers), the number and the identity of long-lived connections on a network is generally independent of signaling traffic. Capacity in a network during high-traffic periods can be increased by adding servers (elastic capacity management). However, tearing down long-lived connections to the existing servers and re-establishing those connections at the newly added servers generally causes service disruptions (often at peak load times), and also causes additional signaling traffic on the network.

Figure 2:
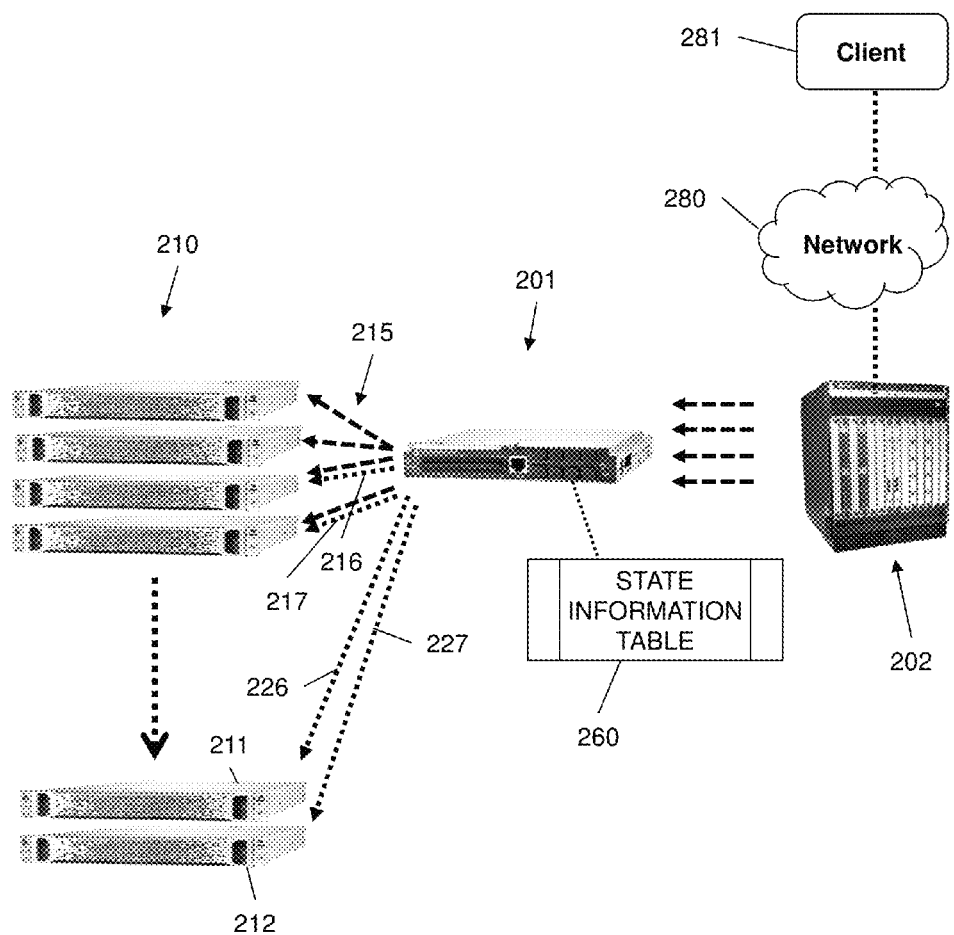
FIG. 2 schematically illustrates a client-server architecture including multiple servers and a load balancer.

FIG. 2 schematically illustrates load balancing in a server network 200, according to an embodiment of the disclosure. As shown in FIG. 2, a load balancer 201 is located intermediate between router 202 and a number of servers 210. Client 281 is connected to router 202 via network 280. In an embodiment, network 280 may be an evolved packet core (EPC) network.

The client-server transport connections 215 are stream-control transmission protocol (SCTP) connections. Server network 200 has elastic capacity; that is, its capacity for handling signaling traffic can be increased by adding servers 211 and 212. In this embodiment, load balancer 201 causes live transport connections 216, 217 to be migrated from existing servers 210 to newly added servers 211, 212, as opposed to tearing down and re-establishing those connections. The load balancer maintains a state information table 260 with information regarding the current state of each live connection: its protocol type, destination port, destination IP address, etc. Upon migrating a live connection, the load balancer 201 updates the state information table for that connection (for example, upon migrating connections 216, 217 to servers 211, 212 so that the connections appear as 226, 227 respectively).

The migration process is fully transparent to the other endpoint of the transport connection; no signaling is performed towards the other endpoint, avoiding generation of additional traffic. A live connection may be migrated from one server to another across racks, chassis or datacenters, while appropriately updating the state information table at the load balancer. It will be appreciated that migrating a connection between servers generally requires at most a few milliseconds, so that connections lasting a few seconds can be characterized as long-lived. More generally, any connection lasting longer than the time required for migration may be considered a long-lived connection and thus a candidate for migration.

Figure 3:
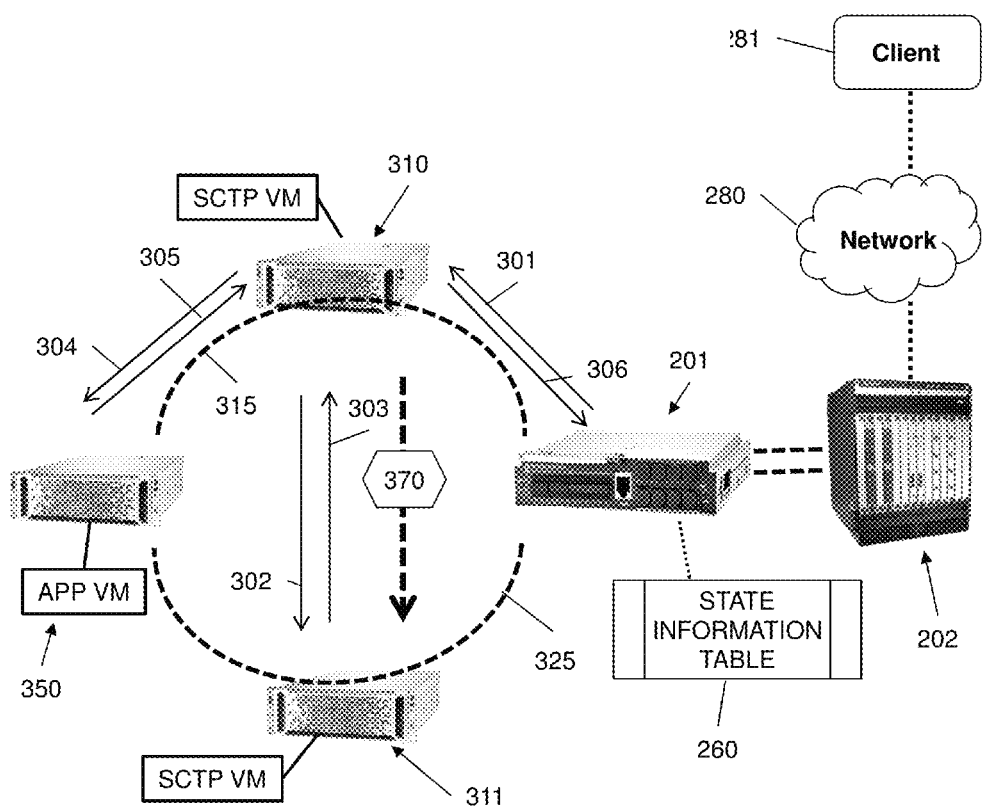
FIG. 3 schematically illustrates migration of inter-server live connections, in accordance with an embodiment of the disclosure.

FIG. 3 schematically illustrates a process for migrating a live connection (e.g. an SCTP connection) in a client-server network 300 that includes client 281, router 202, application server 350 and load balancer 201, in accordance with an embodiment of the disclosure. In this embodiment, application server 350 (executing a virtual machine APP VM) is physically separate from SCTP servers 310 and 311. As shown in FIG. 3, the connection to server 310 is migrated to server 311 (executing virtual machine SCTP VM), so that the client-server signaling path is moved from 315 to 325.

In this embodiment, the load balancer initiates the migration process by sending a message 301 to server 310 (referred to herein as the source server). The source server sends a migration command 302 to the target server 311 with current values of all the state variables for the connection. The target server 311 responds to the command by creating a connection instance and populating state variables with the values provided by the source server. The target server sends an acknowledgment message 303 to the source server. Upon receiving the acknowledgment, the source server sends an update message 304 to the application server, instructing the application server to send future outgoing application data to the target server 311. The application responds by sending an acknowledgment 305 to the source server. The source server then sends a message 306 to the load balancer, indicating that the migration has been performed. The load balancer updates the state information table 260 so that future incoming traffic is routed to server 311 instead of server 310.

In this embodiment, pending data (that is, data being processed at the source server 310 when the migration command 302 is sent, or data incoming at the source server 310 during the migration) is buffered at the source server 310. The buffered data 370 is sent to the target server 311 after the migration is completed.

In other embodiments, the migration command 302 and the state information are sent or relayed by the load balancer 201 to the target server 311, instead of being sent directly from the source server 310.

Figure 4:
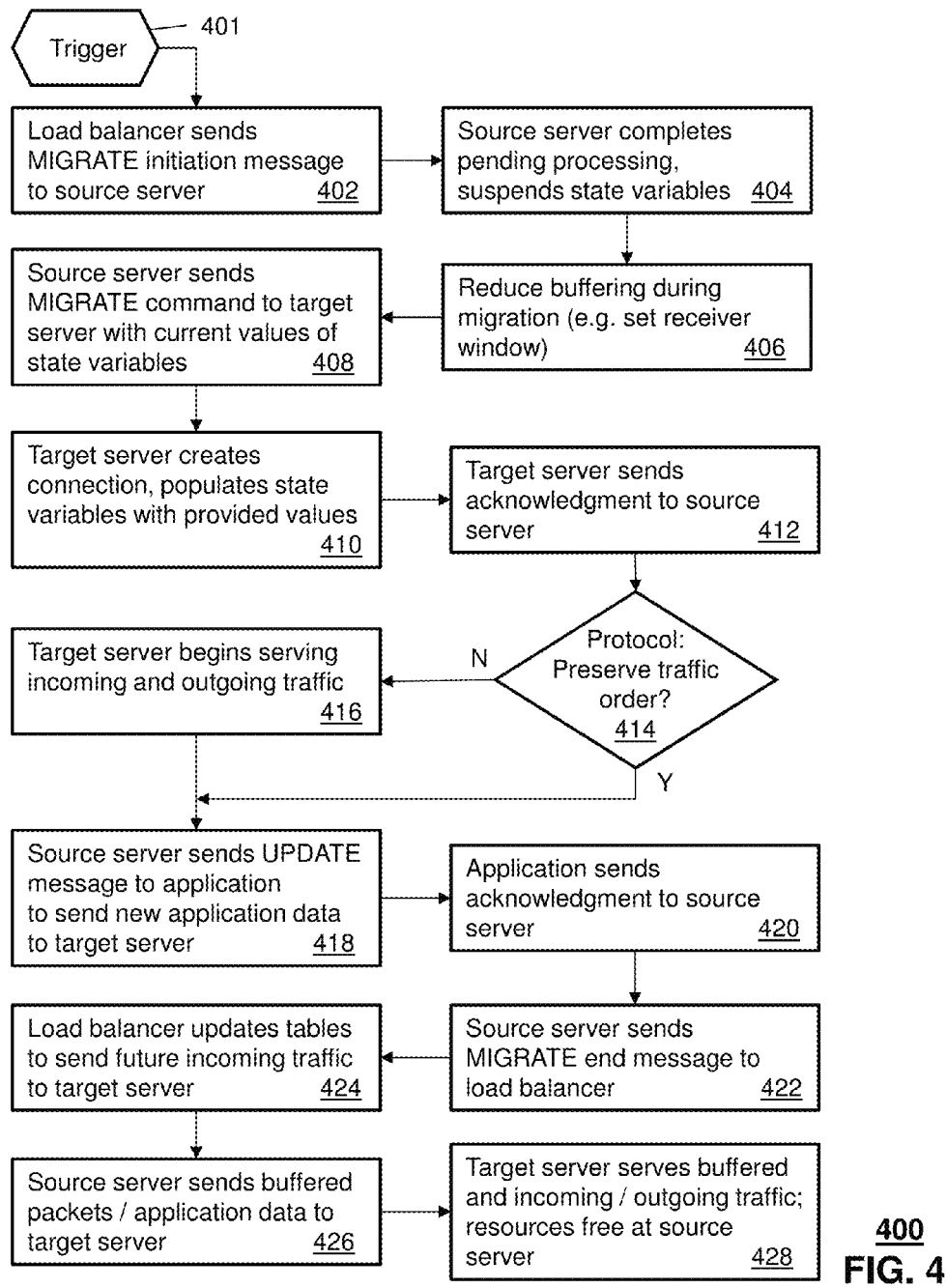
FIG. 4 shows a flowchart illustrating a method used in portions of the system described in FIG. 3.

FIG. 4 is a flowchart depicting a transport connection process 400 in accordance with an embodiment of the disclosure. In this embodiment, the application server is physically separate from the source and target servers, as shown in FIG. 3. The load balancer 201 initiates the migration process in response to a trigger 401 (for example, a signal that one or more servers 310 has reached a predetermined traffic load threshold). In step 402, the load balancer sends a MIGRATE_INIT message to the source server. The source server completes any residual processing of incoming or outgoing packets for the connection to be migrated, and suspends all of the state variables for the connection (step 404). In this embodiment, the amount of buffering required during the migration is reduced (step 406) before sending a migration command to the target server. For example, in a receiver window based flow control protocol such as SCTP, the receiver window can be set to a small value (perhaps zero), and the migration command delayed for approximately one round trip time. This can reduce the amount of in-flight data that needs to be buffered while the connection is being migrated.

The source server then sends a MIGRATE_CMD message to the target server with current values of all the state variables for the connection (step 408). The target server creates a connection instance for the live connection and populates its state variables with the values provided by the source server (step 410). The target server then sends a MIGRATE_ACK message to the source server, indicating compliance with the migration command (step 412).

If the transport protocol does not require that traffic be served in order (step 414), then the target server may start serving incoming and outgoing traffic (step 416). Otherwise, the target server must serve traffic that is buffered at the source server before serving new traffic.

The source server sends an UPDATE_SRVR message to the application (step 418), instructing the application to send future outgoing application data to the target server instead of the source server. The application responds with an UPDATE_ACK message acknowledging the instruction (step 420).

Upon receiving the UPDATE_ACK message from the application, the source server sends a MIGRATE_END message to the load balancer (step 422), indicating that the live connection has been migrated. The load balancer then updates its state information table for the connection to send future incoming traffic of the connection to the target server instead of the source server (step 424). The source server sends the buffered packets and application data 370 to the target server (step 426), and frees the resources of the source server that were used to support the connection (step 428).

In an embodiment, a single MIGRATE_INIT message can be used for migrating more than one connection at a time. In a further embodiment, migration is performed in a multi-homing arrangement, in which all of the participating multi-home endpoints can be migrated from the source server to the target server in one process.

Figure 5:
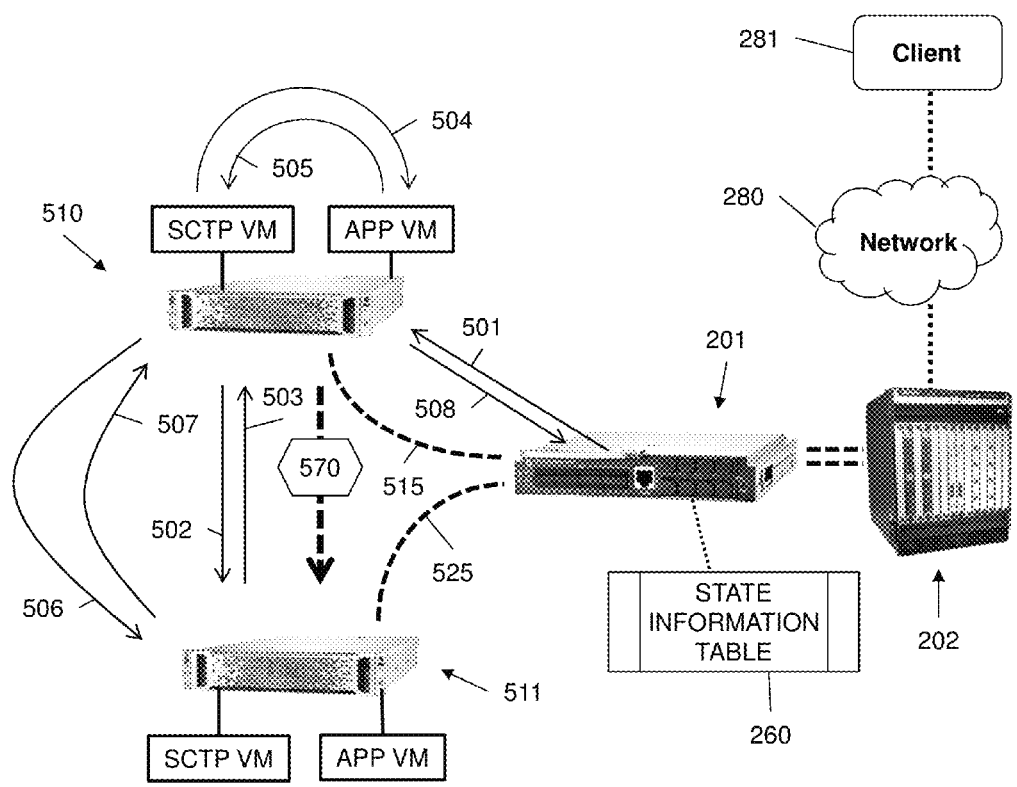
FIG. 5 schematically illustrates migration of inter-server live connections and an application, in accordance with another embodiment of the disclosure.

FIG. 5 schematically illustrates a process for migrating a live connection (e.g. an SCTP connection in a mobility network or an IMS core network) in a client-server network 500 that includes client 281, router 202 and load balancer 201, in accordance with an embodiment of the disclosure. In this embodiment, the application virtual machine (APP VM) and the transport processing virtual machine (SCTP VM) are co-located on the same physical server 510, and process includes migrating both the transport connection and the application context from source server 510 to target server 511. As shown in FIG. 5, the connection is migrated so that the client-server signaling path is moved from 515 to 525.

In this embodiment, the load balancer initiates the migration process by sending a message 501 to source server 510. The source server sends a migration command 502 to the target server 511 with current values of all the state variables for the connection. The target server 511 responds to the command by creating a connection instance and populating state variables with the values provided by the source server. The target server SCTP VM sends an acknowledgment message 503 to the source server SCTP VM. Upon receiving the acknowledgment, the SCTP VM at the source server 510 sends an update message 504 to the APP VM also located at the source server, instructing the APP VM to send future outgoing application data to the target server 511. The APP VM responds by sending an acknowledgment 505 to the SCTP VM.

The application context of the application using the connection is then migrated to the target server, using a MOVE_APP instruction 506. The target server sends an acknowledgment 507. The source server then sends a message 508 to the load balancer, indicating that both the transport connection and the application context have been migrated. The load balancer updates the state information table 260 so that future incoming traffic is routed to server 511 instead of server 510.

In this embodiment, pending data (that is, data being processed at the source server 510 when the migration command 502 is sent, or data incoming at the source server 510 during the migration) is buffered at the source server 510. The buffered data 570 is sent to the target server 511 after the migration is completed.

Figure 6:
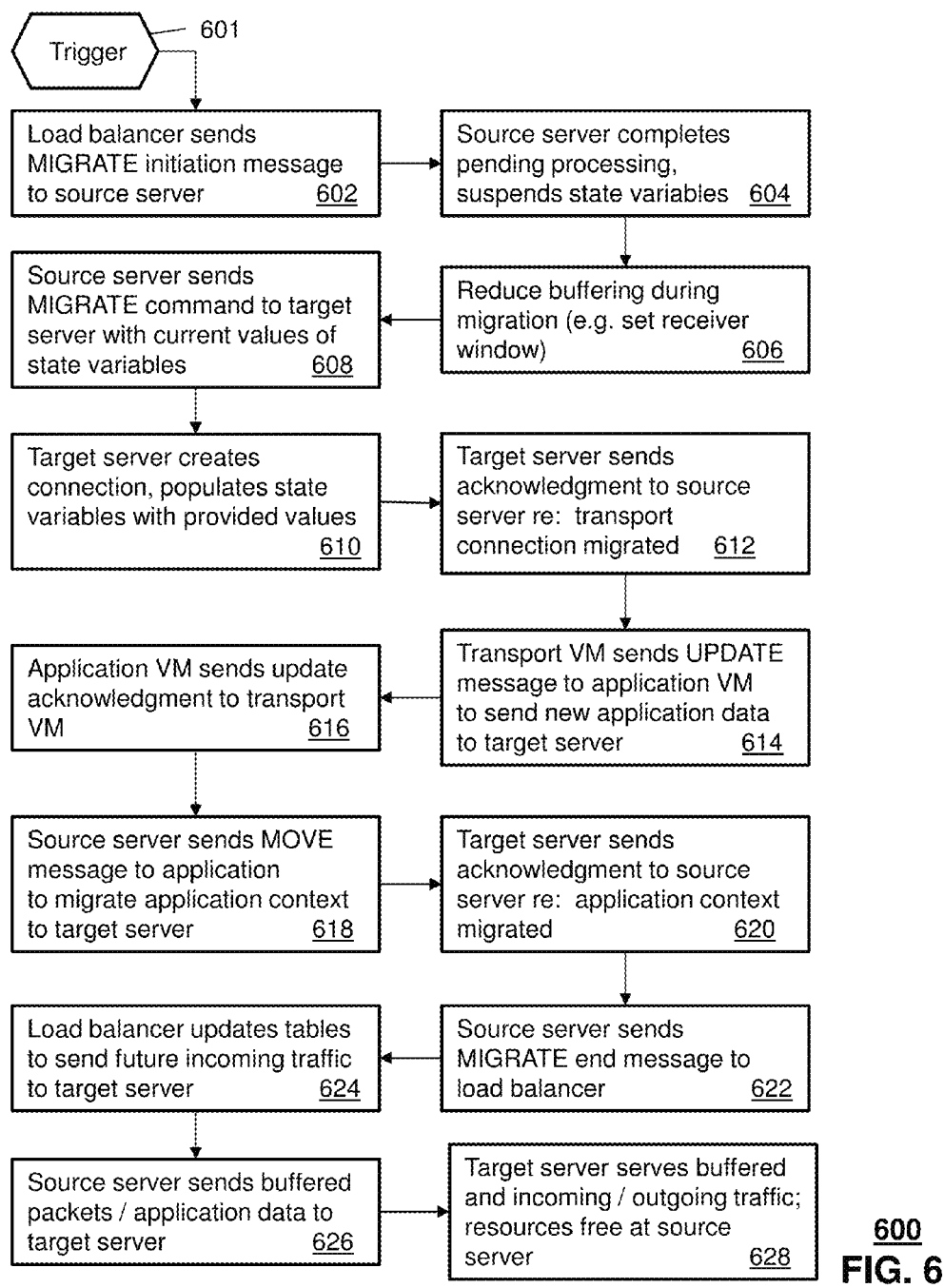
FIG. 6 shows a flowchart illustrating a method used in portions of the system described in FIG. 5.

FIG. 6 is a flowchart depicting a transport connection process 600 in accordance with an embodiment of the disclosure. In this embodiment, the transport protocol is SCTP, and the application virtual machine (APP VM) and transport processing virtual machine (SCTP VM) are co-located on the same physical server (source server), as shown in FIG. 5. The load balancer 201 initiates the migration process in response to a trigger 601 (for example, a signal that one or more servers has reached a pre-determined traffic load threshold). In step 602, the load balancer sends a MIGRATE_INIT message to the source server 510. The source server completes any residual processing of incoming or outgoing packets for the connection to be migrated, and suspends all of the state variables for the connection (step 604). In this embodiment, the amount of buffering required during the migration is reduced (step 606) before sending a migration command to the target server. For example, in a receiver window based flow control protocol such as SCTP, the receiver window can be set to a small value (perhaps zero), and the migration command delayed for approximately one round trip time. This can reduce the amount of in-flight data that needs to be buffered while the connection is being migrated.

The source server then sends a MIGRATE_CMD message to the target server 511 with current values of all the state variables for the connection (step 608). The target server creates a connection instance for the live connection and populates its state variables with the values provided by the source server (step 610). The target server then sends a MIGRATE_ACK message to the source server, indicating compliance with the migration command (step 612).

The transport VM at the source server sends an UPDATE_SRVR message to the application VM (step 614), instructing the application to send future outgoing application data to the target server instead of the source server. The application responds with an UPDATE_ACK message acknowledging the instruction (step 616).

Upon receiving the MOVE APP_ACK message from the application, the source server sends a MIGRATE_END message to the load balancer (step 622), indicating that the live connection has been migrated. The load balancer then updates its state information table for the connection to send future incoming traffic of the connection to the target server instead of the source server (step 624). The source server sends the buffered packets and application data 370 to the target server (step 626), and frees the resources of the source server that were used to support the connection (step 628).

Figure 7:
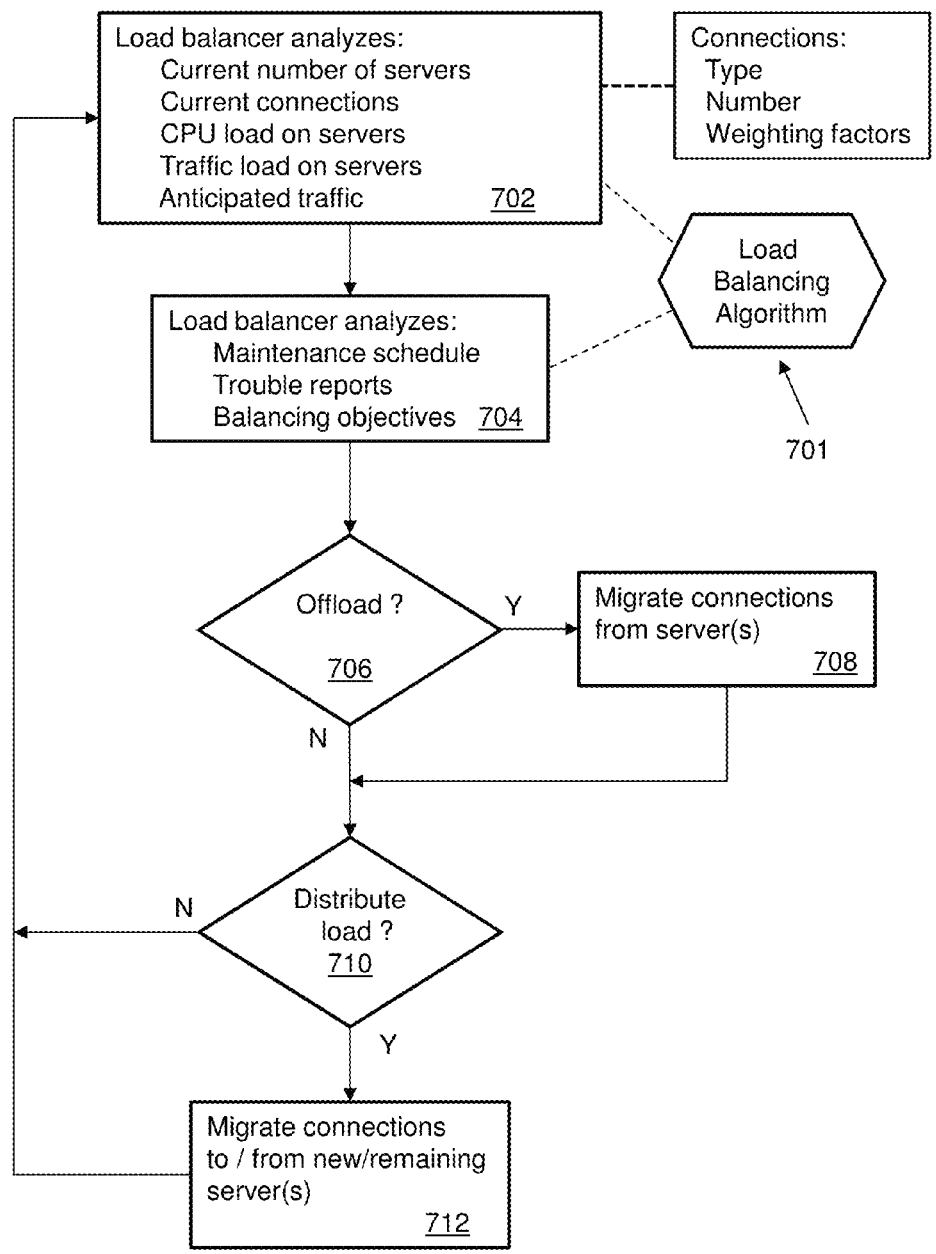
FIG. 7 shows a flowchart illustrating a method for load balancing in a server network with long-lived connections, in accordance with another embodiment of the disclosure.

In an embodiment, the load balancer 201 determines whether live connections should be migrated, or whether servers should be added or removed from the network, based on a variety of factors. FIG. 7 shows a flowchart illustrating a procedure 700 for managing the load in a server network. In this embodiment, the load balancer applies an algorithm 701 that accounts for several factors in determining which connections are to be re-distributed, added or removed across a given set of available servers. In an embodiment, load balancing algorithm 701 can account for the heterogeneity of server hardware and software capabilities, for example: CPU and memory capacity, input/output capabilities, and hardware acceleration (e.g. fast-packet processing); the current performance of the connections; and the physical proximity of the servers in the datacenter. The load balancer analyzes the current state of the network, including the number of servers, the type and number of the connections, the criticality of the connections, the current CPU load and the current traffic load on the servers, etc. The load balancer also analyzes anticipated traffic based on historical traffic data, the current date and time, etc. (step 702). The load balancer also analyzes the maintenance schedule for the network and any pending trouble reports, in view of the balancing objectives for the network (step 704).

It will be appreciated that it is not necessarily the objective to distribute the load evenly across all available servers.

For example, one objective might be to use the minimum number of servers to support a given load, leaving other servers idle and thus available to be removed for maintenance. Another objective might be to run selected servers close to a pre-determined maximum level, and then add servers when the load exceeds that level. In an embodiment, the algorithm can use policy rules as triggers for load balancing.

If the load balancer determines that one or more servers should be removed (step 706), then the connections to those servers are migrated to other servers (step 708). After those servers have been offloaded, the load balancer determines whether new servers should be added, and/or the existing servers should have their load re-distributed (step 710). If so, connections to those servers are migrated from other servers (step 712).

In an embodiment, the load balancer 201 determines the criticality of live server connections by performing a weighted comparison of the connections and applying a variety of weighting factors. For example, the weighting factor for a connection may be based on which client is being connected. The weighting may also depend on the type of connection and/or the expected traffic on that connection. For example, an SCTP connection between a mobility management entity (MME) and a home subscriber server (HSS) is expected to have more traffic than a connection between a MME and an evolved Node B (eNB); the MME-HSS connection would be given greater weight. In other embodiments, the load balancer periodically monitors server usage and makes load balancing determinations based on the speed and capacity of the available servers.

It will be appreciated that load balancing and live connection migration as described herein can be applied in a virtualized mobile packet core environment, and more generally in any environment with long-lived transport connections.

Figure 8:
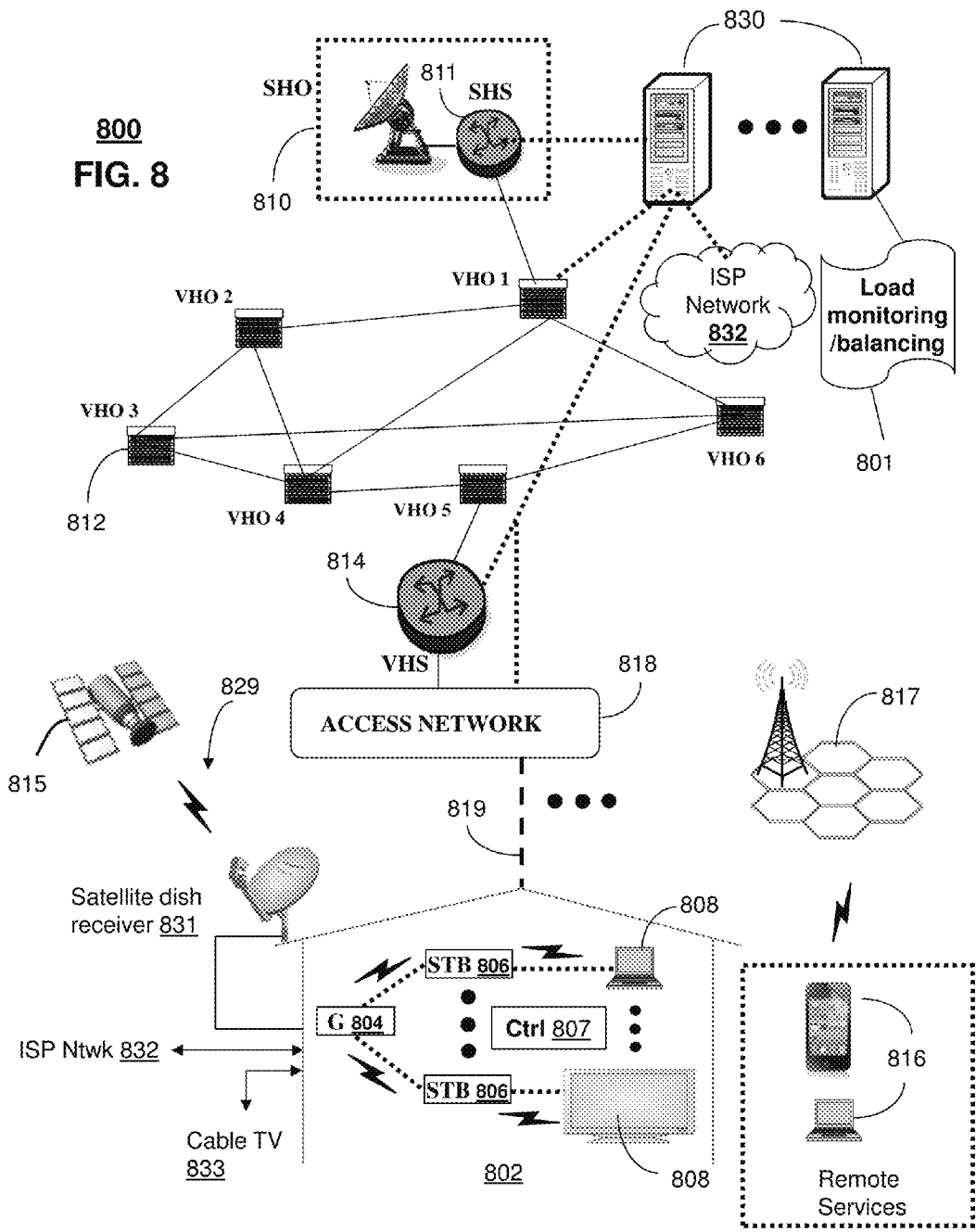
FIGS. 8-9 depict illustrative embodiments of communication systems that provide media services using connections as shown in FIGS. 1-3 and 5.

FIG. 8 depicts an illustrative embodiment of a first communication system 800 for delivering media content. The communication system 800 can represent an Internet Protocol Television (IPTV) media system. Communication system 800 can be overlaid or operably coupled with the systems of FIGS. 1-3 and/or 5 as another representative embodiment of communication system 800. For instance, one or more devices illustrated in the communication system 800 of FIG. 8 can function as a load balancing device that comprises a memory to store instructions and a controller coupled to the memory, where the controller, responsive to executing the instructions, performs operations including detecting a condition requiring a migration of an active transport connection at a source server to a target server without interrupting communications occurring in the active transport connection; directing the source server to transmit to the target server a migration command with state information from the source server to enable migrating the active transport connection to the target server without interrupting communications occurring in the active transport connection; and receiving a message from the source server indicating the source server has received from the target server an acknowledgment that the migrating has been performed.

The IPTV media system can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol.

The VHS 814 can distribute multimedia broadcast content via an access network 818 to commercial and/or residential buildings 802 housing a gateway 804 (such as a residential or commercial gateway). The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to provide a load monitoring and/or balancing function 801 (herein referred to as load monitor/balancer 830). The load monitor/balancer 830 can use computing and communication technology to migrate live transport connections, which can include among other things, the techniques utilized in methods 400, 600 and 700 of FIGS. 4, 6 and 7. The media processors 806 and wireless communication devices 816 can be provisioned with software functions to utilize the services of load monitor/balancer 830.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 9:
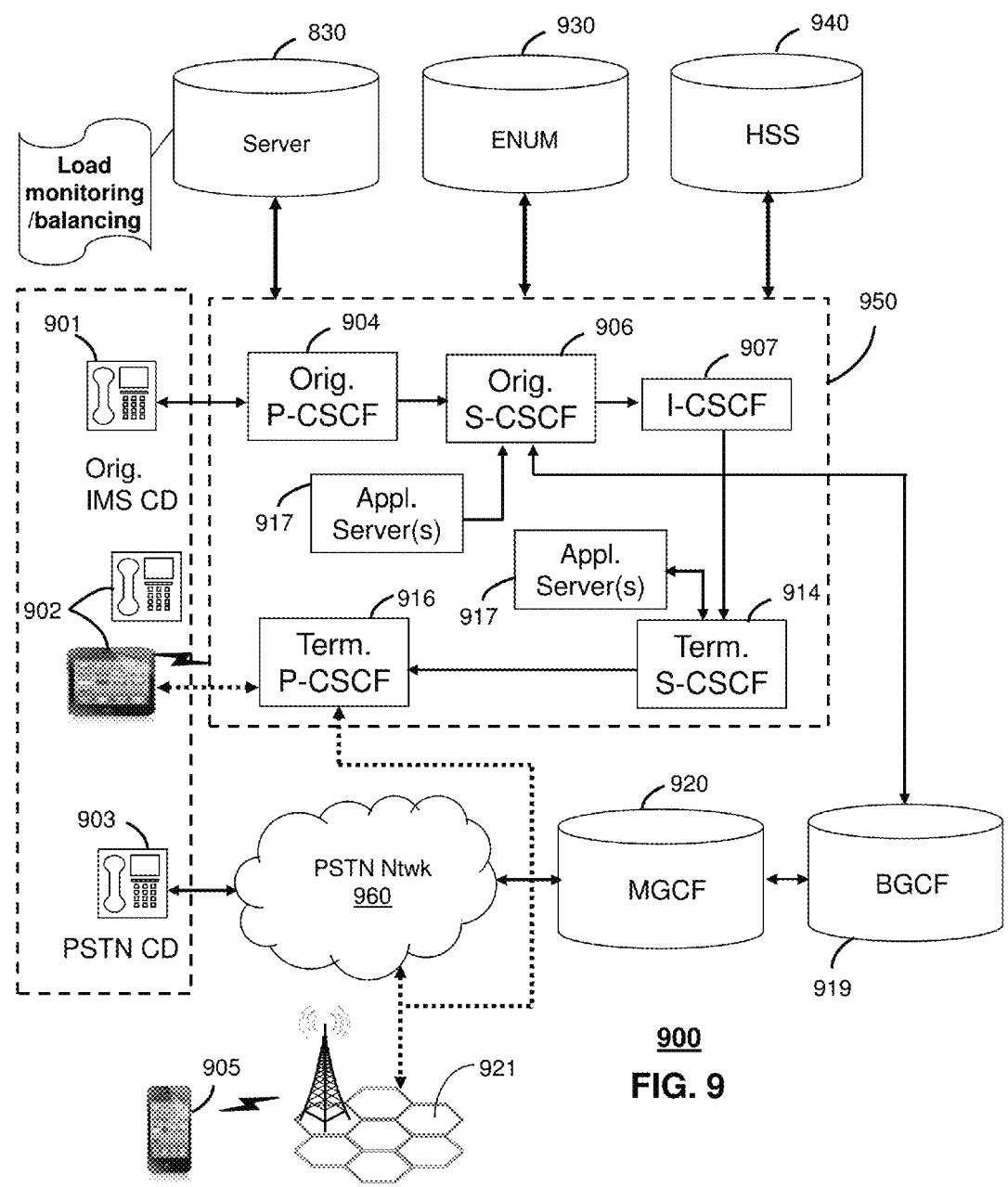

FIG. 9 depicts an illustrative embodiment of a communication system 900 employing an IP Multimedia Subsystem (IMS) network architecture to facilitate the combined services of circuit-switched and packet-switched systems. Communication system 900 can be overlaid or operably coupled with systems including networks 100, 200, 300 and/or 500 and communication system 800 as another representative embodiment of communication system 800. Communication system 900 can perform a method that comprises detecting, by a load balancing device comprising a processor, a condition requiring a migration of an active transport connection at a source server to a target server without interrupting communications occurring in the active transport connection; sending instructions to the source server, wherein the instructions comprise an identification of the target server, an identification of the active transport connection, and a migration request that directs the source server to transmit to the target server a migration command with state information from the source server to enable migrating the active transport connection to the target server without interrupting communications occurring in the active transport connection; receiving a message from the source server indicating the source server has received from the target server an acknowledgment that the migration request has been completed; and updating a table to direct future traffic to the active transport connection managed by the target server.

Communication system 900 can comprise a Home Subscriber Server (HSS) 940, a tElephone NUmber Mapping (ENUM) server 930, and other network elements of an IMS network 950. The IMS network 950 can establish communications between IMS-compliant communication devices (CDs) 901, 902, Public Switched Telephone Network (PSTN) CDs 903, 905, and combinations thereof by way of a Media Gateway Control Function (MGCF) 920 coupled to a PSTN network 960. The MGCF 920 need not be used when a communication session involves IMS CD to IMS CD communications. A communication session involving at least one PSTN CD may utilize the MGCF 920.

IMS CDs 901, 902 can register with the IMS network 950 by contacting a Proxy Call Session Control Function (P-CSCF) which communicates with an interrogating CSCF (I-CSCF), which in turn, communicates with a Serving CSCF (S-CSCF) to register the CDs with the HSS 940. To initiate a communication session between CDs, an originating IMS CD 901 can submit a Session Initiation Protocol (SIP INVITE) message to an originating P-CSCF 904 which communicates with a corresponding originating S-CSCF 906. The originating S-CSCF 906 can submit the SIP INVITE message to one or more application servers (ASs) 917 that can provide a variety of services to IMS subscribers.

For example, the application servers 917 can be used to perform originating call feature treatment functions on the calling party number received by the originating S-CSCF 906 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 906 can submit queries to the ENUM system 930 to translate an E.164 telephone number in the SIP INVITE message to a SIP Uniform Resource Identifier (URI) if the terminating communication device is IMS-compliant. The SIP URI can be used by an Interrogating CSCF (I-CSCF) 907 to submit a query to the HSS 940 to identify a terminating S-CSCF 914 associated with a terminating IMS CD such as reference 902. Once identified, the I-CSCF 907 can submit the SIP INVITE message to the terminating S-CSCF 914. The terminating S-CSCF 914 can then identify a terminating P-CSCF 916 associated with the terminating CD 902. The P-CSCF 916 may then signal the CD 902 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 9 may be interchangeable. It is further noted that communication system 900 can be adapted to support video conferencing. In addition, communication system 900 can be adapted to provide the IMS CDs 901, 902 with the multimedia and Internet services of communication system 800 of FIG. 8.

If the terminating communication device is instead a PSTN CD such as CD 903 or CD 905 (in instances where the cellular phone only supports circuit-switched voice communications), the ENUM system 930 can respond with an unsuccessful address resolution which can cause the originating S-CSCF 906 to forward the call to the MGCF 920 via a Breakout Gateway Control Function (BGCF) 919. The MGCF 920 can then initiate the call to the terminating PSTN CD over the PSTN network 960 to enable the calling and called parties to engage in voice and/or data communications.

It is further appreciated that the CDs of FIG. 9 can operate as wireline or wireless devices. For example, the CDs of FIG. 9 can be communicatively coupled to a cellular base station 921, a femtocell, a WiFi router, a Digital Enhanced Cordless Telecommunications (DECT) base unit, or another suitable wireless access unit to establish communications with the IMS network 950 of FIG. 9. The cellular access base station 921 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 9.

Cellular phones supporting LTE can support packet-switched voice and packet-switched data communications and thus may operate as IMS-compliant mobile devices. In this embodiment, the cellular base station 921 may communicate directly with the IMS network 950 as shown by the arrow connecting the cellular base station 921 and the P-CSCF 916.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The load monitor/balancer 830 of FIG. 8 can be operably coupled to communication system 900 for purposes similar to those described above. Load monitor/balancer 830 can perform migration of live connections in servers coupled to the CDs 901, 902, 903 and 905 of FIG. 9, in accordance with methods 400 and 600. Load monitor/balancer 830 can be integral with of the application servers 917 (as also shown in FIG. 5), and adapted to the operations of the IMS network 950.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 10:
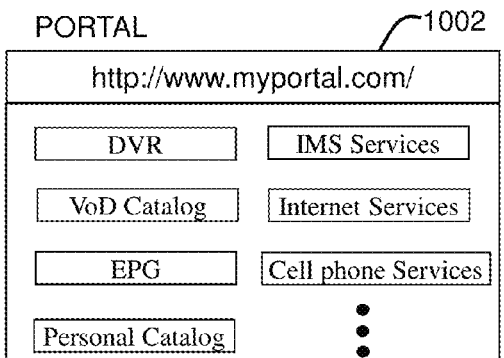
FIG. 10 depicts an illustrative embodiment of a web portal for interacting with the communication systems of FIGS. 8 and 9.
Figure 10:
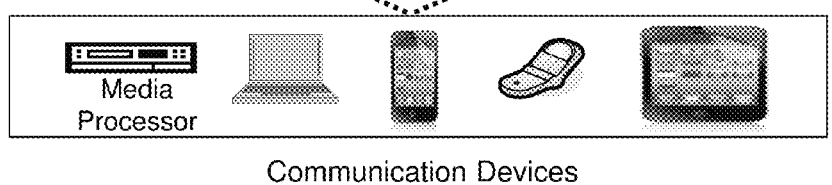

FIG. 10 depicts an illustrative embodiment of a web portal 1002 of a communication system 1000. Communication system 1000 can be overlaid or operably coupled with systems including networks 100, 200, 300 and/or 500, communication system 800, and/or communication system 900 as another representative embodiment of networks 100, 200, 300 and/or 500, communication system 800, and/or communication system 900. The web portal 1002 can be used for managing services of networks 100, 200, 300 and/or 500 and communication systems 800-900. A web page of the web portal 1002 can be accessed by a Uniform Resource Locator (URL) with an Internet browser using an Internet-capable communication device such as those described in FIGS. 8-9. The web portal 1002 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 1002 can also be used for provisioning IMS services described earlier, provisioning Internet services, provisioning cellular phone services, and so on.

The web portal 1002 can further be utilized to manage and provision software applications to adapt these applications as may be desired by subscribers and/or service providers of systems including networks 100, 200, 300 and/or 500, and communication systems 800-900. Service providers can log onto an administrator account to provision, monitor and/or maintain the networks 100, 200, 300 and/or 500, or server 830.

Figure 11:
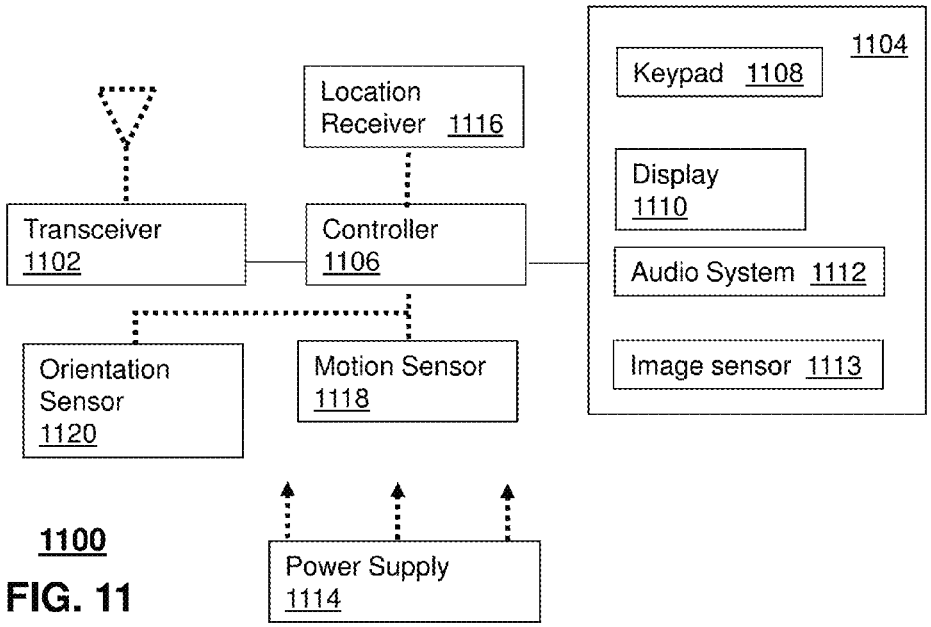
FIG. 11 depicts an illustrative embodiment of a communication device.

FIG. 11 depicts an illustrative embodiment of a communication device 1100. Communication device 1100 can serve in whole or in part as an illustrative embodiment of the devices depicted in FIGS. 8-9. Communication device 1100 in whole or in part can represent any of the communication devices described in FIGS. 8-9 and can be configured to perform portions of methods 300, 600 and/or 700.

Communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth®. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of the media processor 806, the media devices 808, or the portable communication devices 816 of FIG. 8, as well as the IMS CDs 901-902 and PSTN CDs 903-905 of FIG. 9. It will be appreciated that the communication device 1100 can also represent other devices that can operate in communication systems 800-900 of FIGS. 8-9 such as a gaming console and a media player.

Upon reviewing the aforementioned embodiments, it would be evident to an artisan with ordinary skill in the art that said embodiments can be modified, reduced, or enhanced without departing from the scope of the claims described below. For example, load balancing and migration of live transport connections as described herein may be used with a wide variety of transport protocols including TCP, UDP, etc. in addition to SCTP. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 12:
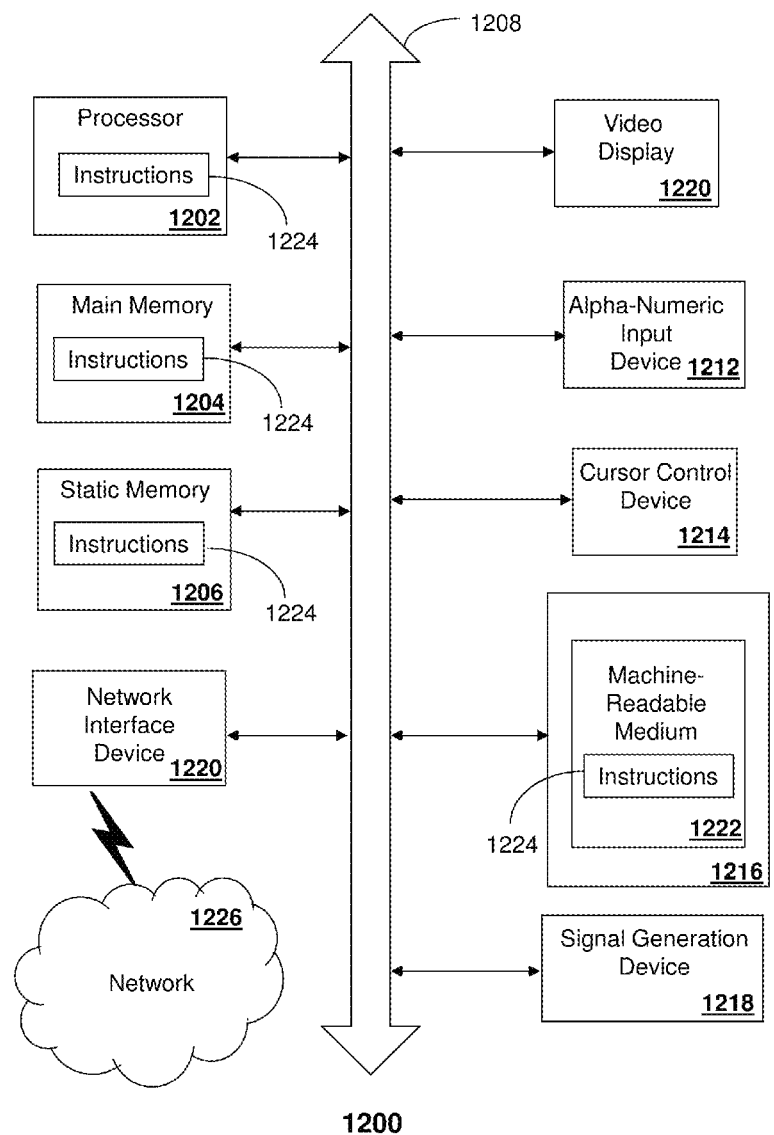
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as the load monitor/balancer 830, the application server 350, and other devices of FIGS. 1-3, 5, 8 and/or 9. In some embodiments, the machine may be connected (e.g., using a network 1226) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU)), a graphics processing unit (GPU, or both), a main memory 1204 and a static memory 1206, which communicate with each other via a bus 1208. The computer system 1200 may further include a display unit 1210 (e.g., a liquid crystal display (LCD), a flat panel, or a solid state display). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1200.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    detecting, by a load balancing device including a processor, a condition requiring a migration of an active transport connection at a source server to a target server without interrupting communications occurring in the active transport connection, wherein the active transport connection is a stream control transport protocol connection, wherein the stream control transport protocol has a duration greater than a duration threshold, and wherein the condition detected by the load balancing device comprises a maintenance condition;
    sending, by the load balancing device, instructions to the source server, wherein the instructions comprise an identification of the target server, an identification of the active transport connection, and a migration request that directs the source server to transmit directly to the target server a migration command with state information from the source server to enable migrating the active transport connection to the target server without interrupting communications occurring in the active transport connection, wherein data of the active transport connection is buffered during the migrating of the active transport connection as buffered data;
    receiving, by the load balancing device, a message from the source server indicating the source server has received directly from the target server an acknowledgment that the migration has been completed; and
    updating, by the load balancing device, a table to direct future traffic to the active transport connection managed by the target server, wherein the table includes the state information and is maintained by the load balancing device and not by the source server or the target server, wherein the load balancing device is a separate device from the source server and the target server.

2. The method of claim 1, wherein the transport protocol is a stream control transmission protocol, and wherein the source server and the target server initiate a coordination process to transition data traffic from the source server to the target server without interrupting communications occurring in the active transport connection.

3. The method of claim 1, wherein the source server and the target server respectively comprise a first virtual machine executing on a source device and a second virtual machine executing on a target device, and wherein the source server and the target server are each in communication with an application server.

4. The method of claim 3, wherein the application server comprises an application virtual machine executing on an application device separate from the source device and the target device.

5. The method of claim 3, wherein the application server comprises an application virtual machine executing on the source device, and wherein the migrating comprises migrating an application context of the application virtual machine from the source device to the target device.

6. The method of claim 1, wherein the active transport connection comprises a first endpoint of a data path, wherein a second endpoint of the data path comprises a client device, and wherein the migrating is performed without signaling the client device.

7. The method of claim 1, wherein the detecting of the condition requiring the migrating comprises monitoring a current state of the source server, the target server, and the active transport connection with respect to a current traffic load on the source server and target server respectively, and anticipating a traffic load on the source server and the target server respectively.

8. The method of claim 1, wherein the migrating comprises a transfer of the buffered data from the source server to the target server, the buffered data comprising data being processed at the source server when the migration command is transmitted or the data is incoming at the source server during the migration.

9. A device, comprising:
    a processing system including a processor; and
    a memory that stores executable instructions that, when executed by the processing system, facilitate performance of operations comprising:
        detecting a condition requiring a migration of an active transport connection at a source server to a target server without interrupting communications occurring in the active transport connection, wherein the active transport connection is a stream control transport protocol having a duration greater than a duration threshold, and wherein the condition comprises a maintenance condition;

directing the source server to transmit directly to the target server a migration command with state information from the source server to enable migrating the active transport connection to the target server without interrupting communications occurring in the active transport connection, wherein the state information is maintained by a load balancing device of the processing system, wherein data of the active transport connection is buffered during the migrating of the active transport connection as buffered data;

receiving a message from the source server indicating the source server has received directly from the target server an acknowledgment that the migrating has been performed; and updating a table that includes state information of active transport connections managed by the source server and the target server to direct future traffic to the active transport connection of the target server, wherein the table is maintained by the load balancing device, and wherein the load balancing device is a separate device from the source server and the target server.

10. The device of claim 9, wherein the operations further comprise updating a table to direct future traffic to the active transport connection managed by the target server, wherein the table includes the state information.

11. The device of claim 9, wherein the operations further comprise transferring the buffered data from the source server to the target server, the buffered data comprising data being processed at the source server when the migration command is transmitted or the data is incoming at the source server during the migration, and wherein the detecting comprises detecting a maintenance condition.

12. The device of claim 9, wherein the load balancing device is located on a data path having a first endpoint comprising the active transport connection and a second endpoint comprising a client device, and wherein the migrating is performed without signaling the client device.

13. The device of claim 9, wherein the source server comprises a first virtual machine executing on a source device and in communication with an application virtual machine executing on the source device, wherein the target server comprises a second virtual machine executing on a target device, and wherein the migrating comprises migrating an application context of the application virtual machine from the source device to the target device.

14. The device of claim 9, wherein the detecting of the condition requiring the migrating comprises monitoring a current state of the source server, the target server, and the active transport connection with respect to a criticality of the active transport connection and a current traffic load on the source server and target server respectively, and anticipating a traffic load on the source server and the target server respectively.

15. A non-transitory machine-readable storage medium comprising executable instructions which, when executed by a processing system including a processor, facilitate performance of operations comprising:

monitoring a current state of a network including a source server, a target server, and a stream control transport protocol connection at the source server;

detecting a maintenance condition requiring a migration of the stream control transport protocol connection to the target server without interrupting communications occurring in the stream control transport protocol connection, wherein the active transport connection is a stream control transport protocol having a duration greater than a duration threshold, and wherein the condition comprises a maintenance condition;

directing transmission from the source server directly to the target server of a migration command with state information to enable migrating the stream control transport protocol connection from the source server to the target server without interrupting communications occurring in the stream control transport protocol connection, wherein data of the stream control transport protocol connection is buffered during the migrating of the stream control transport protocol connection as buffered data;

receiving a message from the source server indicating the source server has received directly from the target server an acknowledgment that the migration has been completed; and updating a table to direct future traffic to the stream control transport protocol connection managed by the target server, wherein the table includes the state information for transport connections of the source server and the target server, wherein the table is maintained by a load balancing device of the processing system, and wherein the load balancing device is a separate device from the source server and the target server.

16. The non-transitory machine-readable storage medium of claim 15, operations further comprise transferring the buffered data from the source server to the target server, the buffered data comprising data being processed at the source server when the migration command is transmitted or the data is incoming at the source server during the migration.

17. The non-transitory machine-readable storage medium of claim 15, wherein the source server is located on a data path having a first endpoint comprising the transport connection and a second endpoint comprising a client device, and wherein the migrating is performed without signaling the client device.

18. The non-transitory machine-readable storage medium of claim 15, wherein the source server comprises a first virtual machine executing on a source device and in communication with an application virtual machine executing on the source device, wherein the target server comprises a second virtual machine executing on a target device, and wherein the migrating comprises migrating an application context of the application virtual machine from the source device to the target device.

19. The non-transitory machine-readable storage medium of claim 15, wherein the monitoring further comprises monitoring a current state of the source server, the target server, and the transport connection with respect to a criticality of the stream control transport protocol connection and a current traffic load on the source server and target server respectively, and anticipating a traffic load on the source server and the target server respectively.

* * * * *